United States Patent [19]

Berkeley

[11] Patent Number: 4,989,654
[45] Date of Patent: Feb. 5, 1991

[54] WOODWORKING WORKABLE ASSEMBLY HAVING AN EXTRUDED T-SLOT

[75] Inventor: James E. Berkeley, Dayton, Ohio
[73] Assignee: Shopsmith, Inc., Dayton, Ohio
[21] Appl. No.: 483,699
[22] Filed: Feb. 23, 1990
[51] Int. Cl.[5] .............................................. B27C 9/00
[52] U.S. Cl. ............................ 144/286 A; 144/124 R; 144/1 R; 144/286 R; 269/100; 403/363; 403/373
[58] Field of Search .............. 144/1 R, 286 R, 286 A, 144/134 R; 269/99, 100; 403/362, 363, 373

[56] References Cited

U.S. PATENT DOCUMENTS

| | | | |
|---|---|---|---|
| 1,026,475 | 5/1912 | Tarbuck | 269/100 |
| 3,900,269 | 8/1975 | Paulot | 403/363 |
| 4,265,283 | 5/1981 | Nash et al. | 144/286 R |
| 4,500,081 | 2/1985 | Carossino | 269/100 |
| 4,510,980 | 4/1985 | Bartlett et al. | 144/1 |
| 4,516,874 | 5/1985 | Yang et al. | 403/363 |
| 4,712,462 | 12/1987 | Cvek | 83/762 |

Primary Examiner—W. Donald Bray
Attorney, Agent, or Firm—Biebel, French & Nauman

[57] ABSTRACT

The present invention provides a woodworking worktable assembly which may be used in combination with a multi-purpose woodworking tool. The worktable assembly includes a worktable having a work supporting surface and an elongated slot formed therein. A guide insert is positioned within the slot and includes a horizontal base portion and opposing side arms for guiding a guide bar portion of a miter guide. Lip portions extend inwardly toward the center of the insert from the upper ends of the arm portions and serve to prevent the miter guide from being lifted vertically away from the slot. In addition, the base of the insert is spaced from the lower portion of the slot by foot portions extending along the length of either side of the base amd fasteners are provided at the center of the insert for drawing the base toward the lower slot surface. Thus, by tightening the fasteners such that the base is drawn toward the slot surface, the arm portions are caused to pivot inwardly such that the tolerance between the insert and a miter guide received therein may be adjusted.

17 Claims, 1 Drawing Sheet

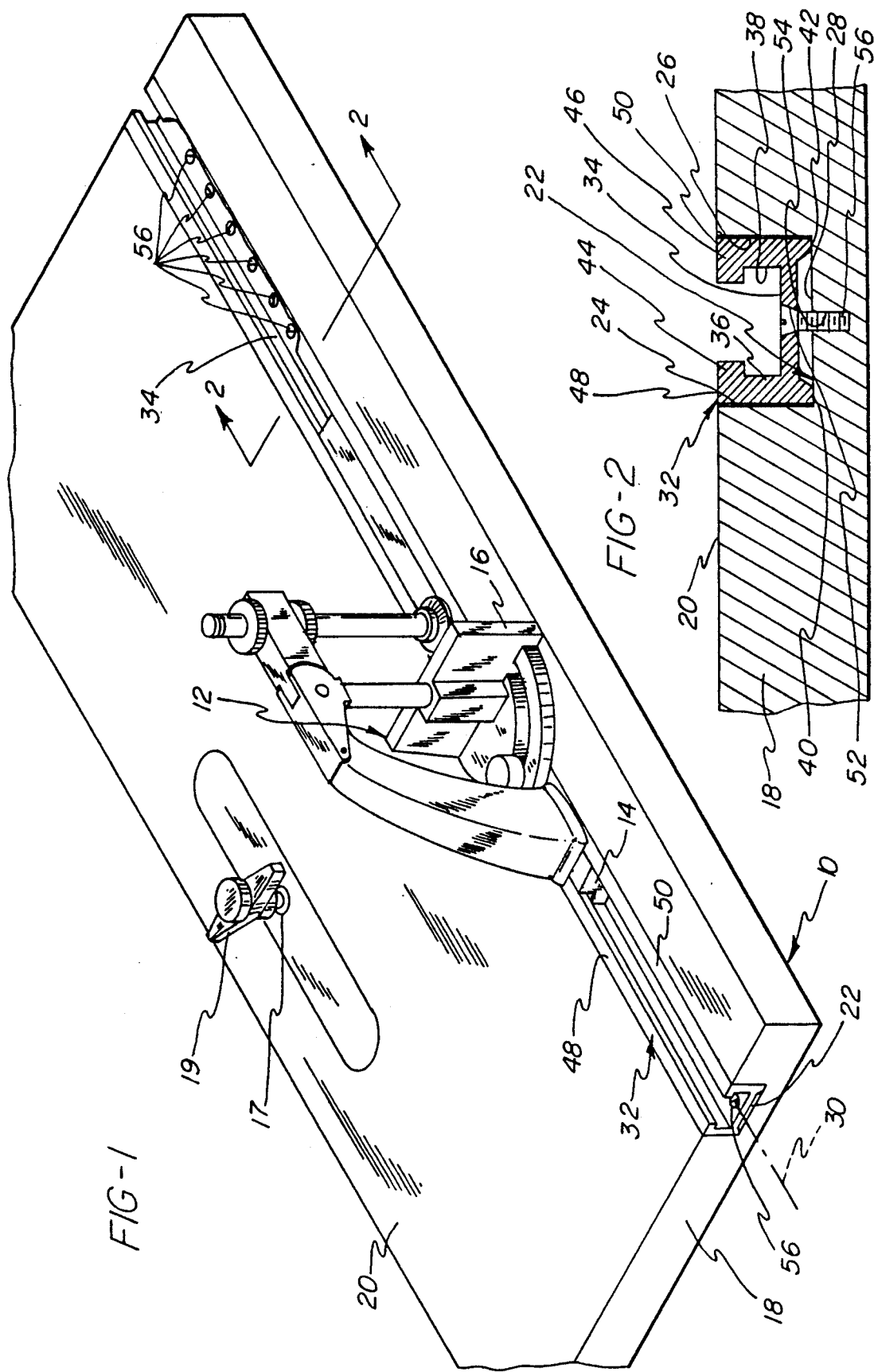

WOODWORKING WORKABLE ASSEMBLY HAVING AN EXTRUDED T-SLOT

BACKGROUND OF THE INVENTION

The present invention relates to woodworking worktable assemblies and, more particularly, to woodworking worktable assemblies which include an elongated slot for receiving and guiding the guide bar portion of a miter guide.

Worktables for use with woodworking tools are typically provided with a planar upper surface and at least one guide slot machined into the upper surface for guiding the guide bar portion of a miter guide used for guiding a workpiece across the worktable. In addition, the worktable typically includes an aperture for receiving a workpiece engaging tool therethrough such that as the workpiece is guided across the surface of the worktable, it engages the tool extending through the aperture. In the case of a worktable used in combination with a multi-purpose woodworking tool, such as is disclosed in commonly assigned U.S. Pat. No. 4,510,980 to Bartlett et al., the guide slot may be used to locate a workpiece relative to a tool located either above or passing through the worktable.

A typical worktable, such as is shown in the Bartlett et al. patient, is formed of a relatively thick piece of metal and at least one guide slot is machined into the upper work supporting surface of the worktable. Further, the slot may include lips which extend inwardly from the upper edges of the slot so as to form a cavity for retaining a guide bar portion of a miter guide located within the slot such that the bar is prevented from being lifted out of the slot in a direction transverse to the longitudinal direction of the slot.

The above-described slot having inwardly extending lips must be precisely machined during manufacture of the table top in order to provide sufficient clearance for the guide bar portion of a miter guide to move through the slot without binding while maintaining close enough tolerances to provide an accurate guide path for the miter guide. In addition, machining of a slot having an overhanging lip configuration requires undercutting a section of the slot along the length of the table which is a difficult operation to perform while maintaining strict tolerances, and any errors occurring during machining of the slot may ultimately result in the entire worktable being scrapped.

Consequently, there is a need for a worktable assembly in which a slot may be provided having overhanging lips to retain the guide bar portion of a miter guide received therein. Further, there is a need for a worktable assembly in which the guide slot for a miter guide is adapted to receive the guide portion of the miter guide within a close tolerance without binding. In addition, there is a need for a worktable assembly having a guide slot in which the previously mentioned characteristics are provided while simplifying the machining steps required to form the guide slot in the worktable.

SUMMARY OF THE INVENTION

The present invention includes a table assembly which may be used in combination with a multi-purpose woodworking tool of the type having a frame including a pair of way tubes and a head stock having a motor driven quill spindle mounted thereon for driving a workpiece engaging tool.

The worktable assembly includes a planar work support surface for supporting a workpiece and an elongated guide slot milled into the work support surface for receiving a guide bar portion of a miter guide to thereby guide a workpiece across the worktable surface by means of a fence portion of the miter guide.

An insert is positioned within the slot and includes opposing side arm portions which are joined together by a base portion extending across the width of the slot. Lip portions extend from the upper edge of the side portions toward the longitudinal center of the slot such that the insert defines a T-shaped cavity within which the guide bar may move. In addition, foot portions extend from opposing edges of the base portion toward a bottom surface of the slot such that the foot portions support the insert with the base of the insert spaced away from the bottom surface of the slot.

The base portion further includes spaced apertures extending along the central longitudinal axis of the slot and aligned with threaded apertures located in the bottom surface of the slot. Fasteners extending through the apertures in the base portion engage the threaded apertures in the bottom surface of the slot to hold the insert in position within the slot. In addition, the fasteners are operable to draw the base portion toward the bottom slot surface such that the side portions pivot about the foot portions inwardly toward each other and the lips pivot downwardly toward the base portion, whereby the tolerance between the insert and the guide bar portion of the miter guide may be adjusted.

Other objects and advantages of the invention will become apparent from the following description, the accompanying drawings, and the appended claims.

BRIEF DESCRIPTION OF THE DRAWINGS

FIG. 1 is a perspective view of the woodworking worktable assembly of the present invention; and FIG. 2 is a cross sectional view taken along the line 2—2 of FIG. 1.

DETAILED DESCRIPTION OF THE PREFERRED EMBODIMENT

Referring to FIG. 1, the worktable assembly of the present invention, designated generally as 10, may be used with a variety of woodworking tools. Thus, the worktable assembly of the present invention may be used in combination with a multi-purpose woodworking tool such as is disclosed in the above-mentioned U.S. Pat. No. 4,510,980 to Bartlett et al.

The woodworking worktable assembly 10 of the present invention is designed to be used with a miter guide 12 having a guide bar portion 14 and a fence portion 16 connected to the guide portion 14 for contacting and guiding a workpiece along the worktable assembly. The worktable assembly 10 includes a worktable 18 having a planar upper work support surface 20 for supporting a workpiece thereon and which includes means defining an aperture 17 therein for receiving a workpiece engaging tool 19 therethrough.

It should be noted that the miter guide 12 and workpiece engaging tool 19 are shown for illustrative purposes only and form no part of the present invention.

As may be seen in FIGS. 1 and 2, the worktable 18 includes a substantially square elongated slot 22 which is milled downwardly into the table 18 from the upper planar surface 20. The slot 22 includes opposing substantially planar vertical sides 24, 26 and a substantially planar horizontal bottom surface 28 oriented parallel to the work support surface 20 and joining the opposing sides 24, 26. Referring to FIG. 1, the slot 22 extends along the entire length of the table 18 and defines a central longitudinal axis 30 about which the slot 22 is symmetrically formed. It should be understood that although the axis 30 is shown as a single line, the terms central longitudinal axis and longitudinal center, as used in this application, are meant to refer to any of the lines located parallel to the line 30 and positioned within a vertical plane passing through the line 30.

An adjustable guide insert 32 is located within the slot 22 and includes means defining a cavity for receiving the guide bar portion 14 of a miter guide 12. The guide insert 32 is preferably formed as an extruded metal member and includes an elongated substantially planar base portion 34 positioned substantially parallel to the bottom surface 28 of the slot 22, and arm or side portions 36, 38 extending from opposing lateral edges of the base portion 34 away from the bottom surface 28 and oriented substantially perpendicular to the base portion 34. Foot portions 40, 42 extend from either side of the base 34 along substantially the entire length of the insert 32. The foot portions 40, 42 protrude from the base 34 in a direction opposite to that of the arm portions 36, 38 such that the foot portions 40, 42 extend toward and contact the bottom surface 28 of the slot 22 and thereby support the base portion 34 of the insert 32 in spaced relation to the bottom surface 28.

The insert 32 is further provided with lip portions 44, 46 located on the ends of the arm portions 36, 38 opposite from the base portion 34. The lip portions 44, 46 extend inwardly toward each other and toward the longitudinal center 30 of the insert and slot. The lip portions 44, 46 are oriented substantially parallel to the base portion 34 and define upper surfaces 48, 50 thereof which are located adjacent to the plane of the upper work support surface 20 of the worktable 18. The base portion 34, arm portions 36, 38 and lip portions 44, 46 define a cavity having an inverted T-shape within the insert 32 which is sized to receive the guide bar 14 of a typical miter guide 12.

The base portion 34 of the insert 32 is further formed with a plurality of spaced apertures 52 located along the central longitudinal axis 30 of the slot 22, and the slot 22 is provided with a plurality of threaded apertures 54 located in the bottom surface 28 thereof and aligned with the apertures 52 in the base portion 34. Fastener means 56 such as screws or bolts pass through the apertures 52 in the base portion 34 to engage in the threaded apertures 54 in the bottom surface 28 of the slot 22 and thereby hold the insert 32 in position within the slot 22. Further, the fastener means 56 act to draw the longitudinally central portion of the base 34 toward the bottom surface 28 of the slot 22 and thereby cause the arm portions 36, 38 to pivot about the foot portions 40, 42 and move inwardly toward the central longitudinal axis 30 of the slot. As the arm portions 36, 38 pivot inwardly, the associated lip portions 44, 46 also pivot inwardly and downwardly toward the base portion 34.

Thus, by tightening the fasteners 56 by a predetermined amount, the arm portions 36, 38 may be caused to move toward one another until they define a predetermined lateral spacing for the sides of the insert cavity 32. Similarly, the lip portions 44, 46 are caused to move in toward the base portion 34 until they achieve a predetermined vertical spacing between the upper and lower surfaces of the cavity. In this manner, the tolerance between the elements forming the sides of insert cavity and a guide bar portion 14 of a miter guide 12 received within the cavity of the insert may be adjusted.

It should be apparent that the woodworking worktable assembly provided by the present invention allows the slot 22 formed in the table 18 to be machined to larger tolerances than conventional miter guide slots since the final guide slot cavity is provided by an insert which lines the machined slot 22. It should also be apparent that the guide insert of the present invention provides a further advantage over guide slots of the prior art worktables in that the insert may be formed as an extruded member and thus the relatively difficult milling operation of forming an undercut slot to provide lip portions is avoided.

Further, by providing means for pivoting the sides and upper lips of the insert inwardly, the slot structure of the present invention provides a convenient means for adjusting the tolerance between the guide bar portion of a miter guide and the side wall portions of the guide insert such that a close fit between the guide bar and the means for guiding the guide bar is not dependent upon accurate machining of the slot.

While the form of apparatus herein described constitutes a preferred embodiment of the invention, it is to be understood that the invention is not limited to this precise form of apparatus and that changes may be made therein without departing from the scope of the invention is defined in the appended claims.

What is claimed is

1. A woodworking worktable assembly for use with a miter guide having a guide bar portion and a fence portion connected to said guide bar portion for contacting and guiding a workpiece, said worktable assembly comprising:

a work support surface for supporting a workpiece;

means defining an elongated slot extending into said work support surface;

adjustable guide means attached within said slot, said guide means lining said slot and including an elongated cavity for receiving the guide bar portion of a miter guide; and adjustment means for adjusting the tolerance between said guide means and a miter guide bar portion received therein.

2. The worktable assembly of claim 1 wherein said guide means includes a base and a pair of arm portions extending from said base, and said adjustment means causes said arm portions to pivot toward and away from each other to adjust the tolerance between said arm portions and a miter guide bar portion received therein.

3. The worktable assembly of claim 2 wherein said guide means includes foot portions extending from said base, said foot portions contacting a surface of said slot to space said base from said slot surface and form pivot points about which said arm portions may pivot.

4. The worktable assembly of claim 3 wherein said adjustment means includes fastener means extending between said base and an adjacent portion of said slot to draw said base toward said slot surface and thereby cause said arm portions to pivot about said pivot points.

5. The worktable assembly of claim 4 wherein said slot defines a central longitudinal axis along the length thereof and said adjustment means includes means in said base defining a plurality of apertures formed therein along said axis and means defining apertures in said slot aligned with said apertures in said base, and said fastener means comprises fasteners passing through said apertures in said base and engaging in said apertures in said slot to draw said base toward said slot surface.

6. The worktable assembly of any one of claims 2-5 wherein said guide means includes a pair of opposing lip portions, each of said lip portions being located on an end of each of said arm portions opposite from said base and extending over said base such that a T-shaped cavity is formed in said guide means.

7. A woodworking worktable assembly for use with a miter guide having a guide bar portion and a fence portion connected to said guide bar portion for contacting and guiding a workpiece, said worktable assembly comprising:
   a work support surface for supporting a workpiece;
   means forming an elongated guide slot in said work support surface, said slot defining a central longitudinal axis;
   an insert having opposing side portions located within said slot, said insert extending substantially along the central longitudinal axis of said slot and defining a cavity for receiving and guiding the guide bar portion of a miter guide; and
   means for moving said side portions toward and away from said central longitudinal axis such that the tolerance between said side portions and the guide bar portion of a miter guide received therein may be adjusted.

8. The worktable assembly of claim 7 further including means for preventing movement of the guide bar portion of a miter guide out of said cavity in a direction transverse to the central longitudinal axis.

9. The worktable assembly of claim 8 wherein said means for preventing movement of a guide bar portion out of said cavity in a direction transverse to the central longitudinal axis includes opposing portions of said insert extending toward each other from said side portions.

10. The worktable of claim 7 wherein said means for moving said side portions toward and away from said central longitudinal axis include raised pivot elements extending from said insert and resting in contact with a surface of said slot.

11. The worktable of claim 10 wherein said insert includes at least two of said raised pivot elements extending along said insert substantially parallel to said central longitudinal axis.

12. The worktable of claim 11 wherein one or more drawing means are provided for drawing a portion of said insert toward said slot surface and thereby causing said side portions to pivot toward each other about said raised pivot elements.

13. A woodworking worktable assembly for use with a miter guide having a guide bar portion and a fence portion connected to said guide bar portion for contacting and guiding a workpiece, said worktable assembly comprising:
   a work support surface for supporting a workpiece;
   means forming an elongated guide slot in said work support surface, said slot defining a central longitudinal axis;
   an insert having opposing side portions located within said slot, said insert extending substantially along the central longitudinal axis of said slot and defining a cavity for receiving and guiding the guide bar portion of a miter guide; and
   lip portions extending inwardly toward the central longitudinal axis from said opposing side portions for retaining the guide bar portion of a miter guide in said cavity.

14. The worktable assembly of claim 13 further including a base portion joining said side portions and forming a side of said cavity opposite from said lip portions.

15. The worktable assembly of claim 14 further including means for moving said side portions toward and away from said central longitudinal axis such that the tolerance between said side portions and the guide bar portion of a miter guide received within said cavity may be adjusted.

16. The worktable assembly of claim 15 wherein said means for moving said side portions further moves said lip portions inwardly toward each other and downwardly toward said base portion to thereby adjust the tolerance between said lip portions and a guide bar portion received within said cavity.

17. A worktable assembly for use with a multipurpose woodworking tool of the type having a motor-driven quill spindle for driving a workpiece-engaging tool, said assembly comprising:
   a planar work support surface for supporting a workpiece and having means defining an aperture therein for receiving a workpiece-engaging tool therethrough;
   means defining a slot extending below the plane of said work support surface, said slot defining a central longitudinal axis and including a bottom surface substantially parallel to said work support surface and a pair of opposing side walls substantially perpendicular to said bottom surface; and
   adjustable guide means located within said slot for receiving a guide bar portion of a miter guide, said guide means being formed as an elongated extruded member;
   said guide means including an elongated substantially planar base portion positioned substantially parallel to said bottom surface;
   arm portions extending from opposing edges of said base portion and extending away from said bottom surface substantially perpendicular to said base portion;
   foot portions extending from opposing edges of said base portion toward said bottom surface such that said foot portions support said guide means with said base portion spaced from said bottom surface;
   lip portions extending from said arm portions toward the longitudinal center of said guide means, said lip portions being oriented substantially parallel to said base portion and having an upper surface located adjacent to the plane of said work support surface, wherein said base portion, arm portions, and lip portions define a T-shaped cavity within said guide means;
   means defining a plurality of spaced apertures in said base portion along the central longitudinal axis of said slot;
   means defining threaded apertures located in said bottom surface and aligned with said apertures in said base portion; and
   fastener means passing through said apertures in said base portion to engage said threaded apertures in said bottom surface to hold said guide means in position in said slot, said fastener means further being operable to draw said base portion along the central longitudinal axis toward said bottom surface such that said arms pivot inwardly toward each other and said lips pivot downwardly toward said base portion and thereby provide means for adjusting the tolerance between said guide means and a guide bar portion of a miter guide received therein.

* * * * *